Oct. 21, 1969  G. VALLETEAU DE MOULLIAC  3,473,796
BUFFER, NOTABLY FOR RAILWAY VEHICLES
Filed April 3, 1967  2 Sheets-Sheet 2

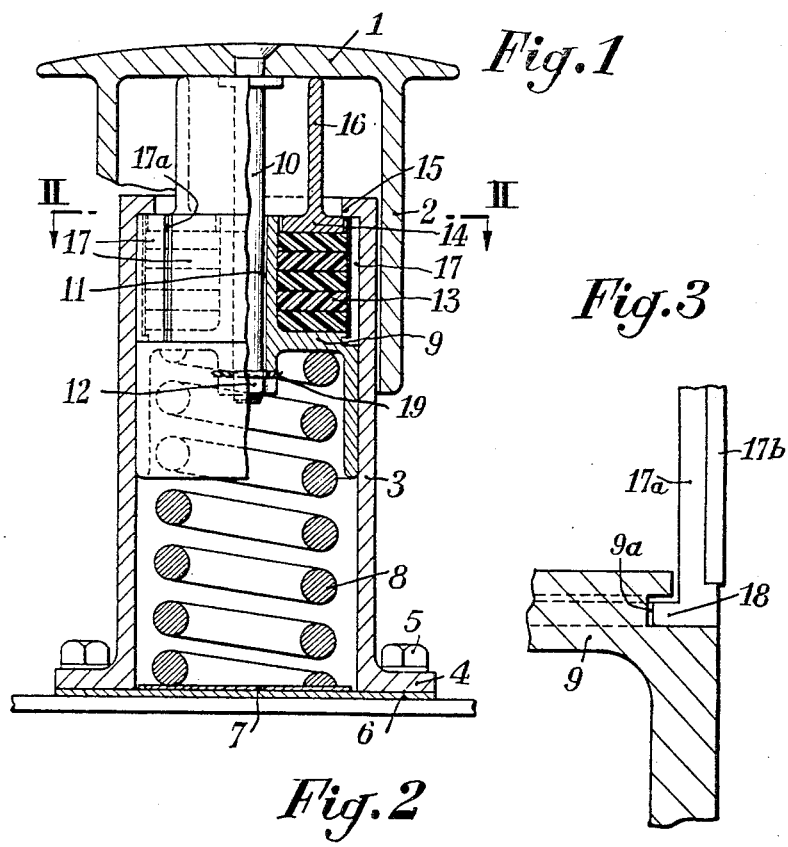
Fig.1
Fig.3
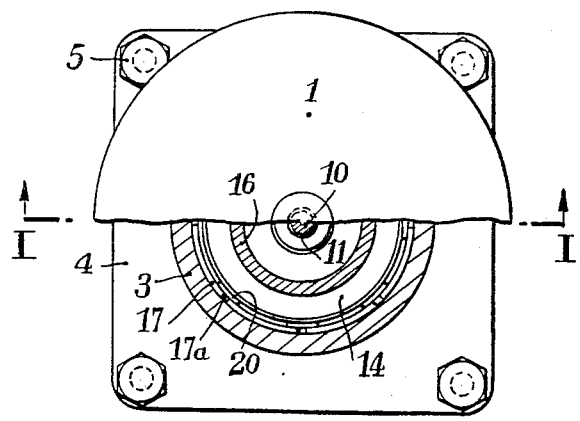
Fig.2

_United States Patent Office_

3,473,796
Patented Oct. 21, 1969

3,473,796
BUFFER, NOTABLY FOR RAILWAY VEHICLES
Guy Valleteau de Moulliac, Argenteuil, France, assignor to Societe Generale Isothermos, Societe Anonyme, Argenteuil, Val d'Oise, France
Filed Apr. 3, 1967, Ser. No. 627,996
Claims priority, application France, Apr. 4, 1966, 56,274
Int. Cl. F16f 3/10, 13/00; B61g 9/04
U.S. Cl. 267—1                              6 Claims

ABSTRACT OF THE DISCLOSURE

A buffer which is characterised in that the rubber pad lies upstream and the spring downstream with respect to the direction of the force to be damped, the spring when compressed retarding the sliding movement of the rubber pad already braked by the frictional engagement of its outer surface, as a consequence of its radial expansion, with the inner surface of the fixed cylinder surrounding it.

---

Shock-absorbing buffers, notably for railway vehicles, are well known, which comprise in series a helical metal spring and a rubber pad which, as a consequence of the longitudinal thrust produced by shocks, expands radially and rubs against a cylindrical surface surrounding it, a relative longitudinal movement setting up between said pad and said cylindrical surface. The frictional contact between the outer periphery of the rubber pad and the inner surface of the cylinder surrounding it provides the desired shock-absorbing action.

It is the object of the present invention to provide a buffer of the type broadly set forth hereinabove which is characterised in that said rubber pad lies upstream and the spring downstream with respect to the direction of the force to be damped, the spring when compressed retarding the sliding movement of the rubber pad already braked by the frictional engagement of its outer surface, as a consequence of its radial expansion, with the inner surface of the fixed cylinder surrounding it.

According to a specific form of embodiment of this invention the disk constituting the shock-receiving head of the buffer is rigid in translation with a first hollow cylinder having its rear portion engaged with a certain clearance in another hollow cylinder guiding the former, a coil spring housed in the rear hollow portion of said second cylinder and bearing with its rear end against a bottom plate, and with its front end against the rear face of a first piston, means for limiting the maximum distance between said first piston and the shock-receiving head of the buffer, a rubber pad disposed between the front face of said first piston and the rear face of a second piston, an inner shoulder formed on the front portion of said second cylinder to prevent said second piston for escaping from the front end of said cylinder, shoes surrounding said rubber pad between the outer surface thereof and the inner surface of said second cylinder, said shoes being rigid in translation with said first piston, and thrust members provided between said second piston and said shock-receiving head. According to a modified form of embodiment of this invention, a similar double-acting device may be provided for constituting, according to the direction in which the stress is applied thereto, either a buffer or a traction device, so that it can absorb in the same manner either traction forces or thrust forces.

The attached drawing illustrates diagrammatically by way of example two typical forms of embodiment of the present invention. In the drawing:

FIGURE 1 is a longitudinal and part-elevational view with parts broken away of a buffer, the section being taken along the line I—I of FIGURE 2;

FIGURE 2 is a view taken partly from one end and partly in cross-section along the line II—II of FIGURE 1;

FIGURE 3 is a view showing on a larger scale a detail of the structure of FIGURE 1;

Figure 4:
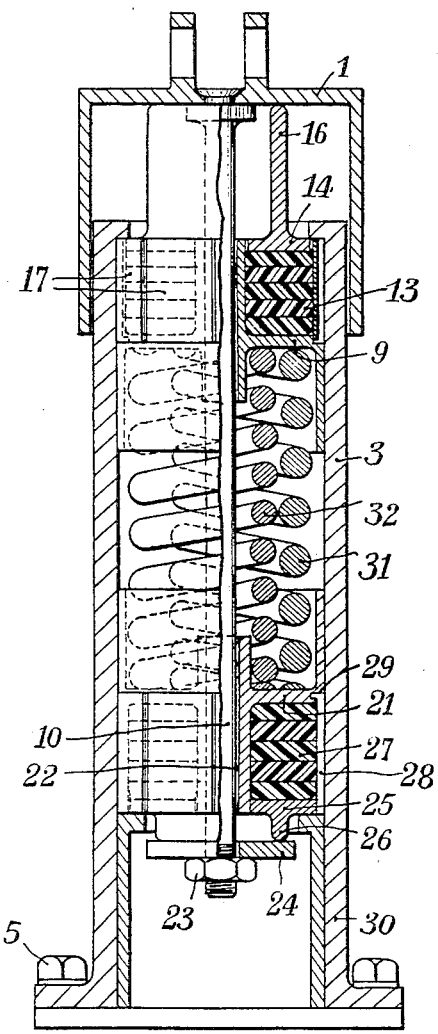
FIGURE 4 is a view similar to FIGURE 1, showing a modified form of embodiment.

The buffer illustrated in FIGURE 1 comprises a disk 1 constituting the shock-receiving head of the buffer; this disk has its rear face formed integrally with a first hollow cylinder 2 having its rear portion slidably mounted with a certain clearance in the front portion of another hollow cylinder 3 having its base 4 adapted to be secured by bolts 5 to a vehicle, with the interposition of a bottom plate 6.

Bearing against the front face of this bottom plate with the interposition, if desired, of washers 7, is a coil metal spring 8 engaging with its front end a first piston 9 adapted to slide in said cylinder 3; a rod 10 rigid with the shock-receiving head 1 of the buffer is adapted to slide through a central aperture 11 provided to this end in the piston 9, and a nut 12 limits the distance between the piston 9 and the shock-receiving head 1; a rubber pad 13 is further disposed concentrally to said rod 10 against the piston 9 and another piston 14 retained in the hollow cylinder 3 by an internal shoulder 15 formed at the front end of this cylinder. A tubular thrust member 16 rigid with said piston 14 contacts the rear face of the shock-receiving head 1.

Longitudinal shoes 17 are disposed at spaced angular intervals between the outer surface of the rubber pad 13 and the inner surface of said second hollow cylinder 3 and abut with their outer edges against the shoulder 15 of cylinder 3; the inner ends of these shoes 17 are formed with in-turned flanges or shoulders 18 engaging a groove 9a provided to this end in the outer periphery of piston 9; thus, when a shock is applied to the shock-receiving head 1 the latter is suddenly pushed towards the base plate 6 and carries along during its movement the thrust members 16 and piston 14 which will thus compress the rubber pad 13 against the piston 9 while the rod 10 slides freely through said piston 9; as a consequence of this pressure the rubber pad 13 expands radially and its outer surface exerts a radial pressure against the aforesaid shoes 17 which are thus caused to frictionally engage the inner surface of the second hollow cylinder 3; due to the longitudinal thrust thus produced the piston 9 is carried along in turn towards the base plate 4 while compressing the coil spring 8.

When the pressure exerted against the shock-receiving head 1 of the buffer is released, the rubber pad 13 is allowed to resume its initial or inoperative condition and therefore to expand longitudinally, whereby any risk of jamming as currently observed with hitherto known buffers of this type is safely avoided; if desired, a spring 19 may be interposed between the nut 12 and piston 9 to maintain a constant contact between the thrust members 16 and the rear face of the shock-receiving head 1; the washers 7 may be used for pre-stressing the spring 8.

Thin longitudinal strips 20 may be provided in front of the gaps 17a separating the adjacent longitudinal edges of shoes 17 to prevent the jamming of the rubber pad 13, these shoes being provided in turn, if desired, with friction linings 17b.

Figure 5:
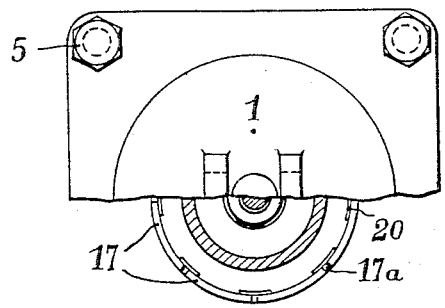
FIGURE 5 is a view taken partly from one end and partly in cross-section, similar to FIGURE 2, of this modified form of embodiment.

In the form of embodiment illustrated in FIGURES 4, 5 the shock-absorbing or buffer device described hereinabove is slightly modified so that it can also be used as a traction device; to this end, it comprises similar component elements disposed in the same manner and designated by the same reference numerals, this arrangement being completed however by a third piston 21 also guided in the cylinder 3 and formed with a bore 22 freely engaged by an extension of rod 10 which, through the medium of a nut 23, is adapted to transmit a tractive effort to a bearing plate 24; between said third piston 21 and a fourth piston 25 bearing through the medium of a thrust member 26 against the bearing plate 24 is another rubber pad 27, and shoes 28 are disposed between the outer surface of this pad 27 and the inner surface of the second cylinder 2; these shoes 28, like the shoes 17 of the above-described form of embodiment, are rigid in translation with said third piston 21, due to their inner flange or shoulder 29, and abut with their opposite ends against a fourth fixed internal cylinder 30.

The device illustrated in FIGURES 4 and 5, when operated as a buffer, behaves exactly like the device illustrated in FIGURES 1 to 3; in fact, when a shock is applied to the head 1, the latter through the medium of thrust members 16 and second piston 14, will compress the rubber pad 13 which is caused to expand radially, thus producing a strong frictional contact between the shoes 17 and the inner surface of the second hollow cylinder 3; it is only subsequently, after the rubber pad 13 has been compressed, that the first piston 9 is forced backwards and its translation is retarded by the coil spring 31 and possibly by a second complementary spiral spring 32.

If a tractive effort is exerted on the device the shock resulting therefrom is absorbed in the manner; in fact, the head 1 carries along, through the medium of rod 10, nut 23, bearing plate 24, thrust members 26 and piston 25, the second rubber pad 27 which expands freely and produces through the medium of the shoes 28 associated therewith a frictional contact with the inner surface of cylinder 3; it is only subsequently that the piston 21 is carried along in turn towards the other piston 9 against the antagonistic force of springs 31 and 32 bearing against the piston 9, this piston 9 bearing in turn against the rubber pad 13 and fixed shoulder 15.

Of course, the two forms of embodiment of the invention which are described hereinabove with reference to the attached drawing should not be construed as limiting the scope of the invention since they are gievn by way of illustration only and many modifications and variations can be brought thereto. Thus, notably, the inner face of the second piston 14 transmitting the pressure from the shock-receiving head 1 of the buffer to the rubber pad 13, instead of being flat, may be convex, concave or frusto-conical, so that its modifications in shape may constitute additional parameters for adjusting or presetting the shock-absorbing characteristics of the buffer.

What I claim is:

1. A shock-absorbing buffer device for vehicles comprising a shock-receiving head, a sleeve fixed to said head, means defining a cylinder rigid with the vehicle and open at one end adjacent said head, said sleeve being disposed slidably mounted on said cylinder, a first piston having a central bore and a skirt slidably mounted in said cylinder, a coil spring disposed between said piston and the bottom of said cylinder, an annular shock-absorbing pad disposed on said piston opposite said spring to engage under compression the inner surface of said cylinder, a second piston disposed between said shock-receiving head and said shock-absorbing pad, and having a central bore, means defining an abutment shoulder on said second piston for engagement with a rear face of said head, means extending through said two pistons limiting the maximum axial movements of said first piston in relation to said shock-receiving head, and means defining an internal shoulder on the outer end of said cylinder for retaining said second piston.

2. A buffer as set forth in claim 1, comprising shoes disposed between said shock-absorbing pad and the inner surface of said cylinder and rigid in translation with said first piston.

3. A buffer as set forth in claim 1, wherein said means limiting the relative distance between said first piston and said shock-receiving head is an axial rod secured at one end to said head and having its opposite end tightly secured by means of a nut and washer against the inner end of said first piston.

4. A shock-absorbing bufler device for vehicles, comprising, means defining a cylinder having a bottom and an open end, a first flat piston slidably mounted in said cylinder, a compression spring interposed between said cylinder bottom and said flat piston, a shock-receiving head external of said cylinder opposed to said bottom and slidable relative to said cylinder toward and away from said bottom, another piston spaced axially from said flat piston and slidably mounted in said cylinder and movable towards said bottom in response to shocks received by said shock-receiving head, means mounting said shock-receiving head for sliding movement relative to said cylinder and guiding the sliding movement of said shock-receiving head in relation to said cylinder and to the pistons slidably mounted therein, means retaining said pistons within said cylinder, means limiting the movement of said shock-receiving head away from the open end of said cylinder, axial guide means disposed between said pistons, an annular, compressible, resilient pad in a space defined between said pistons, said axial guide means and said cylinder, and longitudinal brake shoes actuated by said pad under compression and having inner and outer arcuate surfaces interposed between the outer surface of said annular pad and the inner surface of said cylinder.

5. A shock-absorbing buffer device as set forth in claim 1, wherein brake linings are provided on the outer surface of said brake shoes to coact with the inner surface of said cylinder.

6. A shock-absorbing buffer device as set forth in claim 1, usable as a traction device, wherein, the bottom of said cylinder is movable and constitutes a third piston, and comprising a fourth piston slidably mounted in said cylinder and farther removed from said shock-receiving, head than the first mentioned three pistons, a stop limiting the sliding movement of said fourth piston in said cylinder in a direction opposite to that of the other pistons, axial guide means disposed between said third and fourth pistons, another compressible, annular, resilient pad in a space between said third and fourth pistons, said axial guide means being disposed between said two pistons and said cylinder, longitudinal brake shoes actuated by said another pad under compression and having inner and outer arcuate surfaces interposed between the outer surface of said another annular pad and the inner surface of said cylinder, and means enabling said shock-receiving head to drive said fourth piston in the direction of said third piston when a force is applied to said head in a direction away from said bottom.

References Cited

UNITED STATES PATENTS

| | | | |
|---|---|---|---|
| 2,684,160 | 7/1954 | Dentler | 213—32 |
| 2,930,491 | 3/1960 | Cook | 213—221 |
| 2,933,200 | 4/1960 | Quinn et al. | 213—22 |
| 2,982,426 | 5/1961 | Mulcahy et al. | 213—221 |

DRAYTON E. HOFFMAN, Primary Examiner

U.S. Cl. X.R.

213—22, 32, 45, 221